United States Patent
Gervasio et al.

(10) Patent No.: US 11,977,047 B2
(45) Date of Patent: May 7, 2024

(54) SILVER-SILVER SULFIDE REFERENCE ELECTRODE

(71) Applicant: Arizona Board of Regents on Behalf of the University of Arizona, Tucson, AZ (US)

(72) Inventors: Dominic Francis Gervasio, Tucson, AZ (US); Kalin Denton, Tucson, AZ (US); Gil-Pyo Kim, Tucson, AZ (US); Vlad Alex Sasaran, Tucson, AZ (US); Nicholas Michael McEvoy, Tucson, AZ (US); Alexis Gray, Tucson, AZ (US)

(73) Assignee: Arizona Board of Regents on Behalf of the University of Arizona, Tucson, AZ (US)

( * ) Notice: Subject to any disclaimer, the term of this patent is extended or adjusted under 35 U.S.C. 154(b) by 0 days.

(21) Appl. No.: 17/461,771

(22) Filed: Aug. 30, 2021

(65) Prior Publication Data
US 2022/0091064 A1  Mar. 24, 2022

Related U.S. Application Data (60) Provisional application No. 63/071,390, filed on Aug. 28, 2020.

(51) Int. Cl.
*G01N 27/30* (2006.01)
*C25D 11/34* (2006.01)
(Continued)

(52) U.S. Cl.
CPC .......... *G01N 27/301* (2013.01); *C25D 11/34* (2013.01); *G01B 7/06* (2013.01); *G01N 17/02* (2013.01); *G01N 27/48* (2013.01)

(58) Field of Classification Search
CPC ...... G01N 27/301; G01N 17/02; G01N 27/48; C25D 11/34; G01B 7/06
See application file for complete search history.

(56) References Cited

U.S. PATENT DOCUMENTS

| | | | |
|---|---|---|---|
| 2014/0048424 A1* | 2/2014 | Gu | G01N 17/02 204/404 |
| 2014/0158536 A1* | 6/2014 | Thompson | G01N 27/333 204/406 |

(Continued)

FOREIGN PATENT DOCUMENTS

| | | | | |
|---|---|---|---|---|
| CN | 103472107 A | * | 12/2013 | |
| CN | 104828773 A | * | 8/2015 | ............. B82B 1/002 |
| GB | 2074323 A | * | 10/1981 | ......... G01N 27/4162 |

OTHER PUBLICATIONS

Yeske et al., The silver/silver sulfide reference electrode for use in corrosion studies in kraft white liquor: Project 3556, 1984 (Year: 1984).*

*Primary Examiner* — Luan V Van
*Assistant Examiner* — Shizhi Qian
(74) *Attorney, Agent, or Firm* — Polsinelli PC (57) ABSTRACT

This present disclosure is directed to a silver metal wire coated with silver sulfide reference electrode, the preparation via anodization of a silver metal wire in a sodium and/or potassium sulfide solution and use thereof, including test methods to measure corrosion in test articles such as metal pipes. The reference electrode exhibits good stability characteristics, including stability under high temperature conditions.

10 Claims, 6 Drawing Sheets

(51) Int. Cl.
  *G01B 7/06* (2006.01)
  *G01N 17/02* (2006.01)
  *G01N 27/48* (2006.01)

(56) References Cited

U.S. PATENT DOCUMENTS

2019/0204257 A1* 7/2019 Horwood ............. G01N 27/301
2021/0318229 A1* 10/2021 Burak .................. G01N 27/301

* cited by examiner

SILVER-SILVER SULFIDE REFERENCE ELECTRODE

CROSS REFERENCE TO RELATED APPLICATIONS

This application claims the benefit of U.S. Provisional Application No. 63/071,390, filed on Aug. 28, 2020. The entirety of the foregoing is hereby incorporated by reference.

STATEMENT OF FEDERALLY SPONSORED RESEARCH AND DEVELOPMENT

This invention was made with government support under DE Grant No. EE0008539 awarded by U.S. Dept. of Energy. The government has certain rights in the invention.

FIELD OF THE INVENTION

The field of the invention relates generally to reference electrodes, the preparation and use thereof.

BACKGROUND

Infrastructure in the United States continues to age and there is always the need for technology which alleviates some of the problems associated with aging infrastructure. Corroding pipes is a major infrastructure headache. Water companies need to monitor corrosion rates to track how the thinning of the pipe wall to determine when the pipes need to be replaced. Typically, a sensor is used to analyze the rate of metal loss from the pipes to estimate the service life of the pipes.

For decades, metal piping systems have been the standard choice of engineers and architects in industrial applications because of their strength and durability in high heat and pressure environments. There are certain drawbacks with using metal pipes. Specifically, corrosion can be a real concern. Corrosion affects flow rates and efficiency, weakens pipes, and can lead to unexpected and costly shutdowns.

Corrosion is a complex series of reactions between the water and metal surfaces and materials in which the water is stored or transported. When the fluid in pipes pH levels extend outside of neutral levels (+/−7) or salt is introduced (e.g. brackish or sea water), metals start to corrode and can degrade relatively quickly. There are different types of corrosion that affects pipes, including: pitting and crevice corrosion. The primary health concern is the potential for the presence of elevated levels of lead and copper in the water.

There is an urgent need for sensors suitable for measuring corrosion related to, for example, rates of metal loss from pipes, as well as an automated program that can be used to convert corrosion data derived from polarization (current vs. voltage) curves to corrosion rates, and enable feedback control of corrosion rates.

DESCRIPTION

One aspect of the invention pertains to a reference electrode apparatus comprising a silver metal wire and a silver sulfide coating on the metal wire, wherein the silver sulfide coating is formed by anodizing the silver metal wire in an aqueous sodium sulfide and/or potassium sulfide solution. In some embodiments, the reference electrode apparatus further comprises a coating of titania or magnesia disposed on the silver sulfide coating.

In further embodiments, said reference electrode apparatus further comprises a tubular jacket having a proximal end and a distal end, wherein the sulfide coated silver metal wire extends through an opening at the proximal end of the tubular jacket and into an electrolyte solution. In some embodiments, the electrolyte solution comprises a sodium chloride/potassium chloride molten salt.

Another aspect of the invention pertains to a method for preparing a silver/silver sulfide reference electrode apparatus, said method comprising putting a silver metal wire into a solution of sodium sulfide and/or potassium sulfide, and anodizing the silver metal wire to form a coating of silver sulfide on the silver metal wire to obtain a silver/silver-sulfide reference electrode (SSRE).

Another aspect of the invention pertains to a method of measuring corrosion rate of a pipe of a pipe and/or pipe thickness loss, said method comprising:
  a) using a device comprising a reference electrode as disclosed herein to control voltage between device under test (DUT) and silver/silver-sulfide reference electrode (SSRE) so the potential at the DUT versus the SSRE is known, and then measure the data (i.e., the electrochemical current through the DUT versus a counter electrode as a function of the potential of the DUT versus SSRE;
  b) applying a means for calculating metal corrosion current that converts to corrosion rate to obtain mass loss from said pipe (in grams/year) and/or pipe thickness loss (in mm/year) (e.g., a computer, smart tablet, smartphone, etc.)
  wherein said method optionally comprises applying a means for controlling potential, recording mass loss (including pipe thickness loss) data and/or displaying said data (e.g., computer, ASIC, tablet, smartphone).

A further aspect of the invention pertains to a method of measuring the corrosion rate of a pipe, said method comprising:
  a) using a device comprising a reference electrode as disclosed herein to control voltage between device under test (DUT) and silver/silver-sulfide reference electrode (SSRE) so the potential at the DUT versus the SSRE is known, and then measure the data (i.e., the electrochemical current through the DUT versus a counter electrode as a function of the potential of the DUT versus SSRE;
  b) applying a means for calculating metal corrosion current that converts to corrosion rate to obtain mass loss from said pipe (in grams/year);
  wherein said method optionally comprises applying a means for controlling potential, recording mass loss data and/or displaying said data.

Another aspect of the invention pertains to a method of measuring pipe thickness loss, said method comprising:
  a) using a device comprising a reference electrode as disclosed herein to control voltage between device under test (DUT) and silver/silver-sulfide reference electrode (SSRE) so the potential at the DUT versus the SSRE is known, and then measure the data (i.e., the electrochemical current through the DUT versus a counter electrode as a function of the potential of the DUT versus SSRE;
  b) applying a means for calculating metal corrosion current that converts to corrosion rate to obtain pipe thickness loss (in mm/year)
  wherein said method optionally comprises applying a means for controlling potential, recording mass loss data and/or displaying said data.

In some embodiments, said means for calculating metal corrosion current (e.g. in Amp/s) is a computer, an application-specific integrated circuit (ASIC), a tablet, or smartphone.

In some embodiments, said means for calculating metal corrosion current (e.g. in Amp/s) is a computer, an ASIC, a tablet, or smartphone.

In some embodiments, the method of measuring corrosion rate of a pipe of a pipe and/or pipe thickness loss, optionally comprises applying a means of controlling the potential of the metal of said pipe versus said reference electrode and recording the corrosion current on said metal (e.g., using a potentiostat or a Keithly 2400 Source-meter, which is optionally programmed with Labview software or other software with similar capabilities).

In some embodiments, the reference electrode apparatus as disclosed herein when exposed to saturated potassium chloride solution at 25° C. shows a steady potential at about −0.2 V versus a silver/silver chloride electrode for at least one day.

Another aspect of the invention pertains to a method of making a silver/silver sulfide reference electrode apparatus, the method comprising:
  a) preparing an aqueous sodium sulfide solution;
  b) submerging one or more silver metal wire strips into said sodium sulfide solution;
  c) connecting the silver metal wire strip to a power supply (using e.g., connection wires), thereby forming a cell;
  d) running a current (e.g., of about 0.01 Amps) through the cell at between about two and about five volts for about 5 to about 10 minutes to coat the silver metal wire strip with silver sulfide, thereby forming the reference electrode apparatus as disclosed herein;
  e) removing the silver/silver-sulfide electrode from positive connection of the power supply;
  f) rinsing and then drying the silver/silver-sulfide electrode;
  g) optionally, submerging a silver sulfide coated end of the electrode into a solution of silver sulfide.

Figure 1:
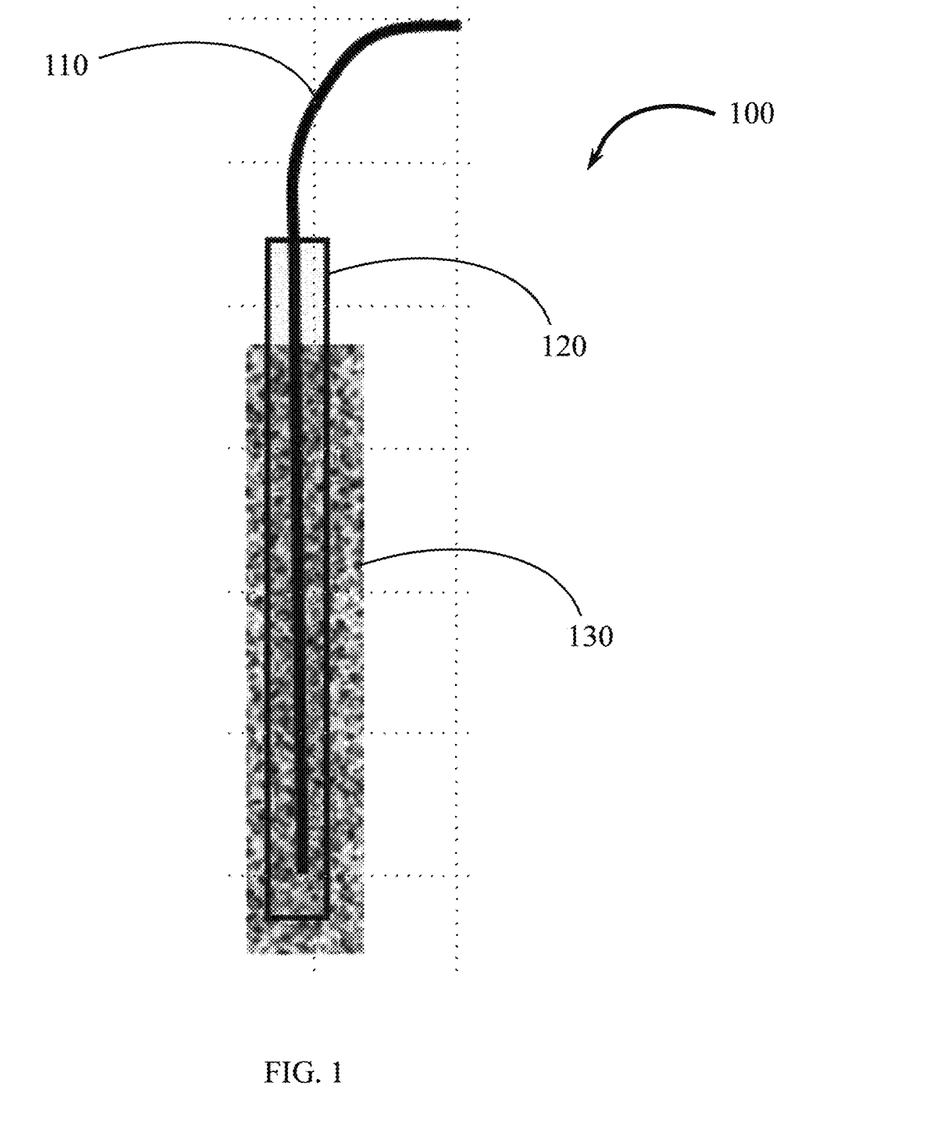
FIG. 1 is a schematic cross-section of an exemplary embodiment of a reference electrode apparatus according to the present disclosure.

In further embodiments, the invention encompasses a reference electrode apparatus according to FIG. 1.

Figure 2:
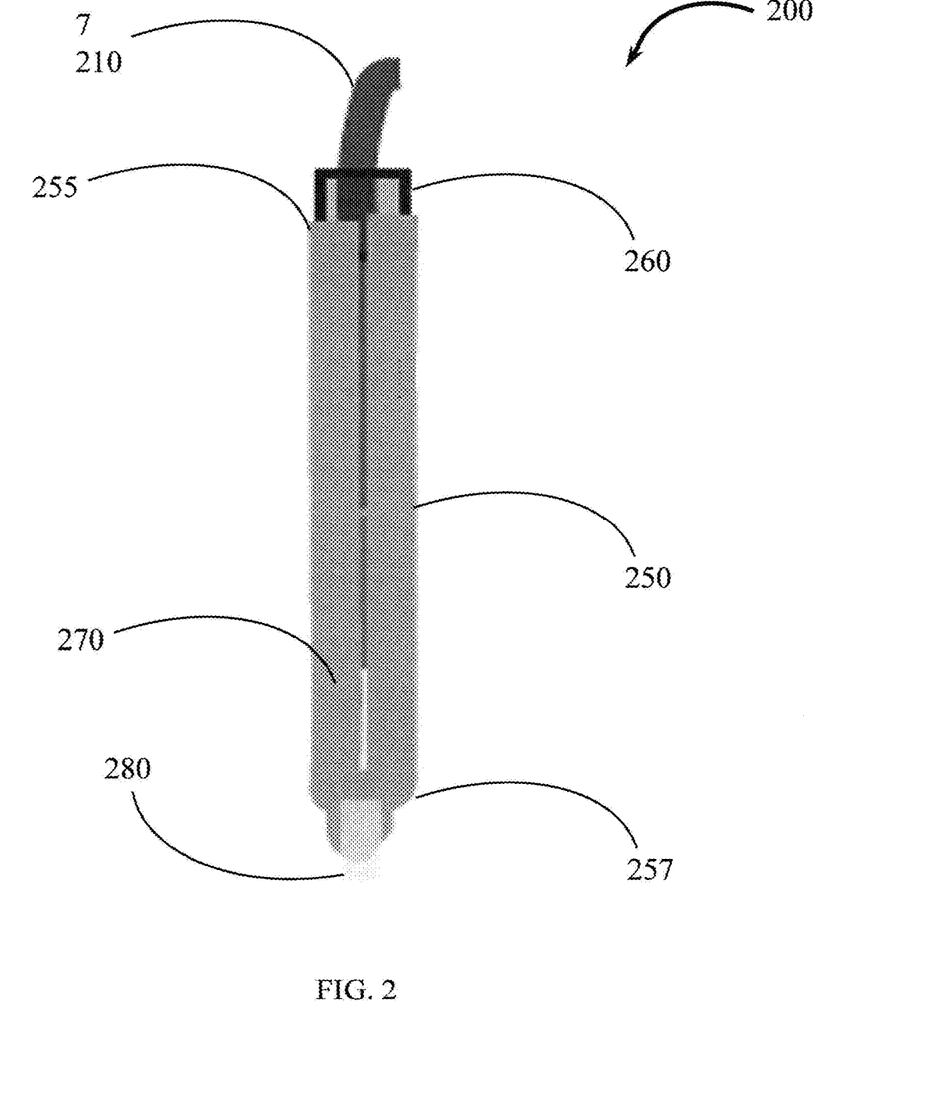
FIG. 2 is a schematic cross-section of an exemplary embodiment of a reference electrode apparatus according to the present disclosure.

In further embodiments, the invention encompasses a reference electrode apparatus according to FIG. 2.

Another aspect of the inventions pertains to an electrochemical cell comprising a reference electrode apparatus of the present disclosure, a working electrode, and a counter electrode, wherein the electrodes are disposed in a defined spaced apart relation.

DEFINITIONS

For the purposes of promoting an understanding of the principles of the invention, reference will now be made to certain embodiments and specific language will be used to describe the same. It will nevertheless be understood that no limitation of the scope of the invention is thereby intended, and alterations and modifications in the illustrated invention, and further applications of the principles of the invention as illustrated therein are herein contemplated as would normally occur to one skilled in the art to which the invention relates.

Unless defined otherwise, all technical and scientific terms used herein have the same meaning as commonly understood by one of ordinary skill in the art to which this invention pertains.

For the purpose of interpreting this specification, the following definitions will apply and whenever appropriate, terms used in the singular will also include the plural and vice versa. In the event that any definition set forth below conflicts with the usage of that word in any other document, including any document incorporated herein by reference, the definition set forth below shall always control for purposes of interpreting this specification and its associated claims unless a contrary meaning is clearly intended (for example in the document where the term is originally used).

The use of "or" means "and/or" unless stated otherwise.

The use of "a" or "an" herein means "one or more" unless stated otherwise or where the use of "one or more" is clearly inappropriate.

The use of "comprise," "comprises," "comprising," "include," "includes," and "including" are interchangeable and not intended to be limiting. Furthermore, where the description of one or more embodiments uses the term "comprising," those skilled in the art would understand that, in some specific instances, the embodiment or embodiments can be alternatively described using the language "consisting essentially of" and/or "consisting of."

As used herein, the term "about" refers to a ±10% variation from the nominal value. It is to be understood that such a variation is always included in any given value provided herein, whether or not it is specifically referred to.

As used herein, the term "a stable potential" refers to when the measured potential is steady for at least 10 minutes and up to several months (minutes, etc.). A theoretical standard reduction potential of silver/silver-sulfide in sodium sulfide solution is −0.89 V vs Ag/AgCl (SSE), which corresponds to a small offset between the fitted experimentally observed value of −0.853 V at room temperature. The measured potential of the silver/silver sulfide electrode of the present invention in saturated potassium chloride solution is steady at −0.2 vs SSE, which is 155 mV more positive than the theoretically expected value of −0.355 vs SSE. The measured potential of the silver/silver-sulfide electrode of the present invention shows a stable potential of −0.2 versus SSE in molten chloride salt (NaCl—KCl) at 800° C.

A reference electrode (RE) is an electrode in an ionic conducting solution, called a half-cell, with a constant electrode potential. The reference electrode is connected by a salt bridge to a second half-cell with another electrode, which is a device under test and is called a working electrode (WE), and voltage (potential difference) is measured between the RE and WE to find the potential at the working electrode versus the reference-electrode potential.

The RE is an essential component in an electrochemical cell to quantitatively observe behavior of the working electrode. A steady current can be passed between the working electrode and another electrode called a counter electrode (CE) while the WE potential is measured versus the RE. This can be repeated for a number of currents between the WE and CE. In this way, a plot of WE current versus WE potential (called the polarization of the working electrode) can be made, and the corrosion rate of a working metal electrode can be determined by this plot of WE current as a function of WE potential.

A reference electrode can be used in many practical applications. For example, a reference electrode may be used to measure the voltage potential of a material or liquid in a pipe. When used in conjunction with other corrosion prevention techniques, a reference electrode can help eliminate oxidation of the pipes, tanks, etc. which carry corrosive material. The typical reference electrode consists of an internal element, normally silver-silver chloride, surrounded by an electrolyte-containing filling solution (commonly KCl, saturated with AgCl) which is contained in either a glass or plastic body salt bridge, which terminates at the liquid junction. It is important that the internal element remain wet and surrounded by the reference electrolyte filling solution.

One aspect of the invention pertains to a novel silver/silver-sulfide reference electrode apparatus that is prepared by anodizing (i.e., electrochemically oxidizing) a silver metal wire in a sodium sulfide solution, resulting in a silver metal wire coated with silver sulfide.

FIG. 1 shows an embodiment of a reference electrode apparatus 100 according to the present disclosure. Silver metal wire 110 has a silver sulfide coating 120, over which an optional second coating 130 is disposed. The second coating 130 can include titania or magnesia, to obtain a "tubeless" reference electrode. A typical outside diameter for the coated electrode is in the range of 9-10 mm.

FIG. 2 shows a further embodiment of reference electrode apparatus according to the present disclosure, in this case a "jacketed" reference electrode apparatus 200. Silver metal wire 210 extends into a tubular jacket (or "jacket") 250 having proximal end 255 and distal end 257, with silver wire 210 passing through cap 260 at proximal end 255. Tubular jacket 250 can be of a suitable electrode material such as quartz. Reference electrode 200 includes chemicals within tubular jacket 250. For a silver/silver sulfide electrode, the chemicals can include, for example, sodium sulfide (and/or potassium sulfide) and silver metal. A zirconia rod (or "tip") 280 with a tortuous path is disposed at distal end 257, enabling an electrical connection through tubular jacket 250. A typical diameter for the tubular jacket 250 is in a range of about 15-20 mm. A typical diameter for the zirconia rod is in a range of from about 1 mm to 2 mm.

The silver/silver-sulfide electrode (SSSE) produced by the process of anodizing is extremely stable, and has a stable potential of 0.886 V versus a silver-silver chloride electrode (SSCE) in aqueous sodium chloride solution at room temperature and in molten chloride salt (NaCl—KCl) at 800° C. The inventors surprisingly found that measured potentials for SSSE versus SSCE during two experiments in 1 molar KCl in air were 0.883 and 0.886V. The test for SSSE versus SSCE run in NaCl—KCl molten salt at 800° C. against the high temperature SSCE was measured at 0.866V.

In some embodiments, the reference electrode of the invention may be operated at lower temperatures than typical reference electrodes. This electrode can be operated from sub ambient (e.g., below room temperature, or even about 25° C., to high temperatures (e.g., 800-900° C.). In fact, the SSSE can routinely be operated at room temperatures (about 20-25° C.).

Advantageously, the electrode of the present disclosure does not "dry out" and is not affected by sulfides. In some embodiments, the reference electrode as disclosed herein may be used to measure sulfide concentrations.

There is currently no universal reference electrode for electrochemical work with ionic liquids. For conventional reference electrodes, the potential is determined by oxides or other surface coatings on the wire, and therefore varies with the type, quality, and cleanliness of the wire. To calibrate the wire reference electrode, a redox couple, such as ferrocene/ferrocenium, is added to the electrolyte. The reduction and oxidation potentials of this redox couple is measured versus the reference electrode wire, and the experimental potentials are corrected to the midpoint of the redox couple reduction/oxidation potentials.

Various methods have been developed to prepare reference electrodes. For example, US Patent Appl. No. 20190204257 ("US20190204257") A1 describes a reference electrode for use in electrochemical testing applications. The reference electrode described therein is a silver wire coated with silver sulfide. The drawback of this reference electrode is at least two-fold. First, the method disclosed in US20190204257 involves making a "low temperature" electrode using materials which can only function reliably at temperatures up to 300° C. Secondly, the silver wire reference electrode disclosed therein is prepared by sublimation of elemental sulfur onto elemental silver metal (Ag(0)) to form silver sulfide. There are several disadvantages to coating the silver wire using sublimation of sulfur. Sulfur is known to have many forms (e.g., 4, 6, or 8-membered rings polymers, etc.). A process involves heating polymorphic elemental sulfur to sublime sulfur onto silver in order to make silver sulfide on silver metal results (as described in US20190204257) in the formation of many different silver sulfide species on the silver wire other than silver sulfide ($Ag_2S$). Sublimation of sulfur on elemental silver is an imprecise way to make a reference electrode, because although the potential from electrode to electrode may be similar, it is not reproducible when making the reference electrode. Reference electrodes should have stable and reproducible potential. This is especially critical for applications such as corrosion monitoring.

One advantage of the present invention is that the reference electrode apparatus of the invention is prepared by using a solution of $Na_2S$ (or $K_2S$) in water to anodize silver wire to obtain silver/silver sulfide (SS) reference electrode which stable and has a reproducible potential. This is a well-behaved process and therefore formation of impurities can be avoided. Furthermore, the resulting silver reference electrode is stable.

In some embodiments, the reference electrode apparatus of the invention may be further coated with titania or magnesia to make a "tubeless" reference electrode. Further, a "cracked junction" reference electrodes may be prepared using the reference electrode apparatus of the invention.

In further embodiments, the cracked junction and tubeless reference electrodes of the invention may be used at high temperature (from the melting point of the molten salt which contains the reference electrode 90° C. for aluminum chlorides, 200° C. for zinc chlorides and 400° C. for magnesium chlorides) up to highest temperatures where the molten salts the reference electrode is in are stable (such as, up to 900° C.).

In some embodiments, when the reference electrode apparatus disclosed herein is exposed to a saturated potassium chloride solution at 25° C. shows a steady potential at about −0.2 V versus a silver/silver chloride electrode for at least one day.

In further embodiments, the reference electrode as disclosed herein further comprises a tubular jacket having a proximal end and a distal end, wherein the sulfide coated silver metal wire extends through an opening at the proximal end of the tubular jacket and into an electrolyte solution. In some embodiments, the electrolyte solution comprises a sodium chloride/potassium chloride molten salt.

One aspect of the invention pertains to a reference electrode apparatus wherein said apparatus is prepared according to the method comprising putting a silver wire Ag(0) in a solution of sodium sulfide ($Na_2S$) or sodium sulfide ($K_2S$); forming $Ag_2S$ on said Ag wire by anodizing Ag wire to generate Ag(+1) which in the presence of sodium sulfide or potassium sulfide reacts to form and deposit $Ag_2S$ on the silver wire to form a silver/silver-sulfide reference electrode (SSRE).

In some embodiments, the invention pertains to an apparatus according to FIG. 1.

In some embodiments, the invention pertains to an apparatus according to FIG. 2.

In some embodiments, the invention pertains to a reference electrode as disclosed herein said electrode, further comprising a tubular jacket having a proximal end and a distal end, wherein the sulfide coated silver metal wire extends through an opening at the proximal end of the tubular jacket and into an electrolyte solution.

LIST OF EMBODIMENTS

1. A reference electrode apparatus, the apparatus comprising:
   a silver wire; and
   a silver sulfide coating formed on the wire to produce a silver sulfide coated silver wire wherein said silver sulfide wire is prepared by anodizing silver wire in an aqueous sodium sulfide solution (e.g., 0.1 M sodium sulfide solution) or aqueous potassium sulfide solution (e.g., 0.1 M sodium sulfide solution).
2. A method of making an apparatus of embodiment 1, said method comprising
   putting a silver wire Ag(0) in a solution of sodium sulfide ($Na_2S$);
   forming $Ag_2S$ on said Ag wire by anodizing Ag wire to generate Ag(+1) which in the presence of $Na_2S$ reacts to form and deposit $Ag_2S$ on the silver wire to form a silver/silver-sulfide reference electrode (SSRE).
3. A method of measuring corrosion rate (of a pipe) (or pipe thickness loss), said method comprising:
   a. using a device comprising a reference electrode of claim 1 to control voltage between device under test (DUT) and the SS reference electrode so the potential at the DUT versus the SSRE is known, and then measure the data, that is, the electrochemical current through the DUT versus a counter electrode as a function of the potential of the DUT versus SSRE;
   b. applying a means for calculating metal corrosion current (e.g., in Amp/s) that converts to corrosion rate which is mass loss (in e.g., grams/year) and/or pipe thickness loss (in e.g. mm/year) (e.g., a computer, smart tablet, smartphone, etc.)
   c. optionally applying a means for controlling potential, recording mass loss data and/or displaying said data (e.g., computer, ASIC, tablet, smartphone).
   optionally, an array of measured current at potential values may be transmitted to a central location like a local area or cloud server where the current and potential data is stored, automatically transformed to desired kinetic parameters of materials, like corrosion potential, corrosion rate of a metal in corrosive medium.
   Alternatively, or in addition to a cloud-based service, the sensor potential values may be generated, stored in local sensor mounted memory, locally processed and transformed to desired kinetic parameters and are presented to the user on a display, also integral to the sensor.
4. The method of embodiment 3, wherein said method optionally comprises applying a means of controlling the potential of the metal of said pipe versus said reference electrode and recording the corrosion current on said metal (e.g., using a potentiostat or a Keithly 2400 Source-meter, which is optionally programmed with Labview software or other software with similar capabilities).
5. A reference electrode apparatus, wherein said apparatus is prepared using the method of embodiment 2 or embodiment 7.
6. The apparatus of embodiment 1, wherein said apparatus shows a stable potential, that is, the reference electrode does not polarize, and has a potential that does not change under small currents (microamperes), which can be generated when the reference electrode is used to measure potential differences between the reference electrode and a device under test, like a working electrode (WE) in order to establish the potential of the WE versus the reference electrode. The theoretical standard reduction potential of silver/silver-sulfide in sodium sulfide solution is −0.89 V vs Ag/AgCl (SSE), which corresponds to a small offset between the fitted experimentally observed value of −0.853 V at room temperature. The measured potential of the silver/silver-sulfide electrode in saturated potassium chloride solution is steady at −0.2 vs SSE, which is 155 mV more positive than the theoretically expected value of −0.355 vs SSE. The measured potential of the silver/silver-sulfide electrode shows a stable potential of −0.2 versus SSE in molten chloride salt (NaCl—KCl) at 800° C.
7. A method of making an apparatus of embodiment 1, said method comprising
   a) Prepare an aqueous sodium sulfide solution;
   b) Submerge one or more silver wire strips into said sodium sulfide solution;
   c) Connect a silver wire strip to a power supply (using e.g., connection wires)
   d) Run a current (e.g., about 0.01 Amps) through cell at between about two and about five volts for 5-10 minutes.

e) Remove silver/silver sulfide electrode from positive connection.
f) Rinse and then dry.
g) Submerge the silver sulfide coated end of the electrode.
8. The apparatus of embodiment 1, comprising coating said silver sulfide coated silver wire with titania or magnesia to obtain a "tubeless" reference electrode.
9. The apparatus of embodiment 1, wherein said reference electrode is prepared using a method of embodiment 2 or embodiment 7.
10. The apparatus of embodiment 1, wherein said apparatus is prepared a method comprising using a solution of $Na_2S$ (or $K_2S$) in water to anodize silver wire to make $Ag_2S$ a reference election.
11. The apparatus of embodiment 10, wherein said apparatus to obtained is stable (that is, the reference electrode potential does not change when small currents pass between the reference electrode and a device under test, that is, a working electrode, WE) and has a reproducible potential (that is, the value of the potential does not change in time when the reference electrode is used to measure a potential difference between the reference electrode and a device under test, that is, a WE) as was told in 6 above.
12. A sensor apparatus comprising said reference electrode apparatus of embodiment 1, wherein said reference electrode apparatus generates output values which are optionally transformed into one or more kinetic parameters of a material (such as metal e.g., in a pipe).
13. The sensor apparatus of embodiment 12, wherein the sensor output values are generated on board the reference electrode apparatus, processed and transformed to desired kinetic parameters of materials, like corrosion potential, corrosion rate of a metal in corrosive medium via a data logger/potentiostat/other sensor reading/computing device that is hard-wired or wirelessly connected to the sensor, whereupon the sensor data presented to the user using a local sensor mounted or remote wireless visual display. Further, the data logger/potentiostat/other sensor reading/computing may be hard-wired or wirelessly connected to a local area network or cloud based, where the sensor output data is stored in server memory, automatically transformed to desired kinetic parameters of materials, like corrosion potential, corrosion rate of a metal in corrosive medium via a server computer and presented to the user using a visual display.
14. The sensor apparatus of embodiment 12, wherein the sensor output values are generated on board the reference electrode apparatus, stored in local sensor mounted memory, processed and transformed to desired kinetic parameters of materials, like corrosion potential, corrosion rate of a metal in corrosive medium via an onboard sensor mounted computer, and presented to the user using a local, sensor mounted visual display. Further, the sensor may include features that facilitate either hard-wired or wireless delivery of sensor output values to a separate local area network or cloud-based computing system whereupon the sensor data presented to the user using a local sensor mounted or remote wireless visual display.
15. The sensor apparatus of embodiment 12, wherein an array of said sensor output values are transmitted to a central server, either in a local area network or cloud based, where the sensor output data is stored in server memory, automatically transformed to desired kinetic parameters of materials, like corrosion potential, corrosion rate of a metal in corrosive medium via a server computer and presented to the user using a visual display. Further, the sensor may include features that facilitate either hard-wired or wireless delivery of sensor output values to a separate local area network or cloud-based computing system whereupon the sensor data presented to the user using a hard-wired or remote wireless visual display.

EXAMPLES

Preparation of Reference Electrode Apparatus

A silver wire may be plated with silver sulfide according to the following procedure.

First, a plating solution of 1 M NaOH and 0.1 M $Na_2S$ was prepared. A silver wire working electrode and a silver wire counter electrode were placed in the plating solution. A salt bridge containing 1 M NaOH was added to provide electrical connection to an Ag/AgCl reference electrode in saturated KCl solution. Silver sulfide was plated either at constant current or constant potential.

Plating at Constant Current

For constant current plating, the procedure consisted of the 4 steps described in Table 1.

TABLE 1

Constant Current Plating Steps

| Step Number | Applied Current (mA) | Duration (s) | Overall Reaction |
| --- | --- | --- | --- |
| 1 | 5 | 60 | $2Ag + S^{2-} \rightarrow Ag_2S + 2e-$ |
| 2 | −5 | 60 | $Ag_2S + 2e- \rightarrow 2Ag + S^{2-}$ |
| 3 | −1 | 60 | $2H^+ + 2e- \rightarrow H_2$ |
| 4 | 5 | 600 | $2Ag + S^{2-} \rightarrow Ag_2S + 2e-$ |

During step 1 the silver reacted on the anode forming a layer of silver sulfide as follows, $2Ag+S^{2-} \rightarrow Ag_2S+2e-$, and the potential was measured while a constant current of 5 mA was maintained (see FIG. 1A).

During the second step, the reaction was reversed by applying −5 mA while the potential was measured. During step 2 the entire silver sulfide layer was reduced to back to metallic silver.

During step 3, a −1 mA current was applied and the potential dropped to the potential of hydrogen evolution.

Finally, during step 4, a 5 mA current was applied for 10 minutes to form silver sulfide on silver for further measurements. After step 4 the open circuit voltage was measured. The open circuit voltage was between the potentials measured in steps 1 and 2.

Figure 3A:
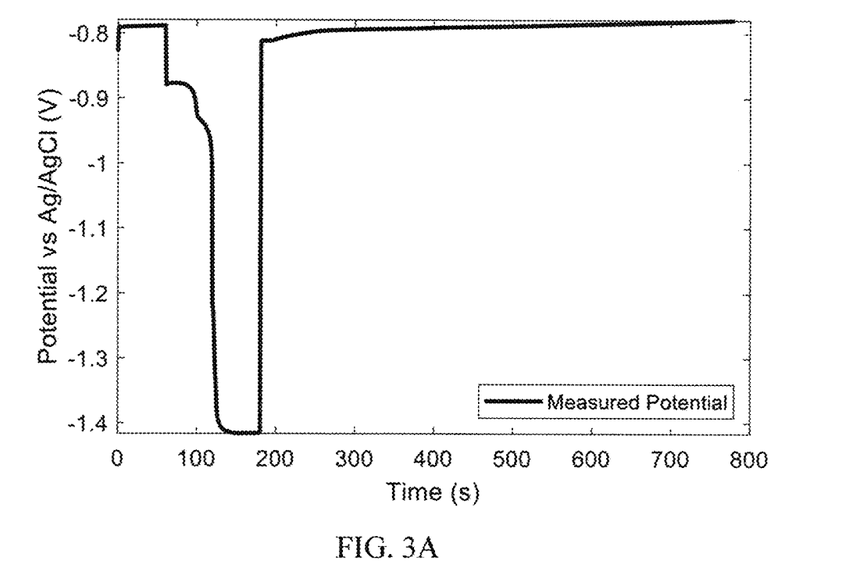
FIGS. 3A and 3B are graphs of potential vs. time and current vs. time, respectively, in a coating method according to the present disclosure.
Figure 3B:
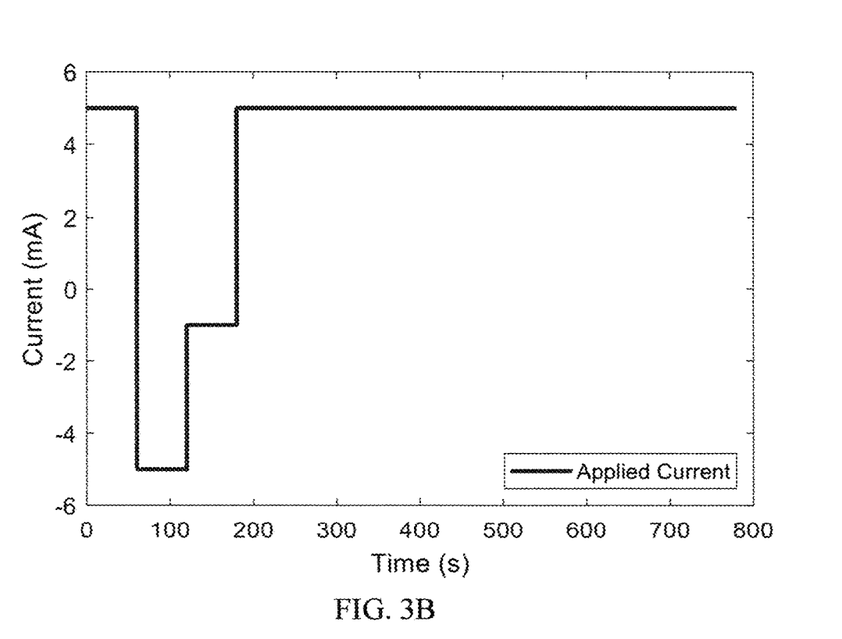

FIGS. 3A and 3B show representative potential/time and current/time data for constant current plating, showing a constant current deposition of silver sulfide in a 1 M NaOH and 0.1 M $Na_2S$ solution. The open circuit voltage measured after plating was −0.83 V vs Ag/AgCl.

Figure 4:
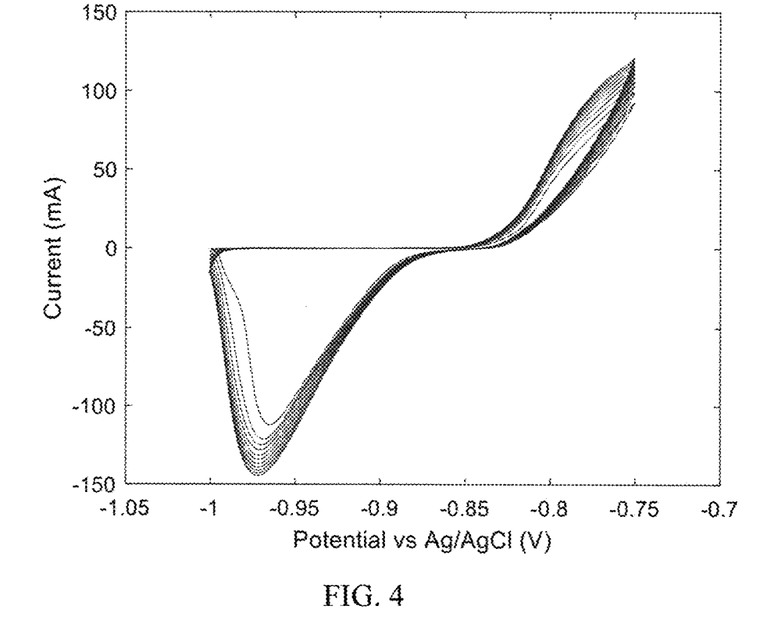
FIG. 4 is a cyclic voltammogram for silver metal wire according to the present disclosure.

For constant potential deposition of silver sulfide, first cyclic voltammetry was performed around the open circuit potential to determine a suitable silver-sulfide deposition potential. A representative cyclic voltammogram is shown in FIG. 4. FIG. 4 shows cyclic voltammetry on a silver wire in 1 M NaOH and 0.1 M $Na_2S$ solution. The scan rate was 20 mV/s and the open circuit voltage was −0.85 V vs SSE.

Figure 5:
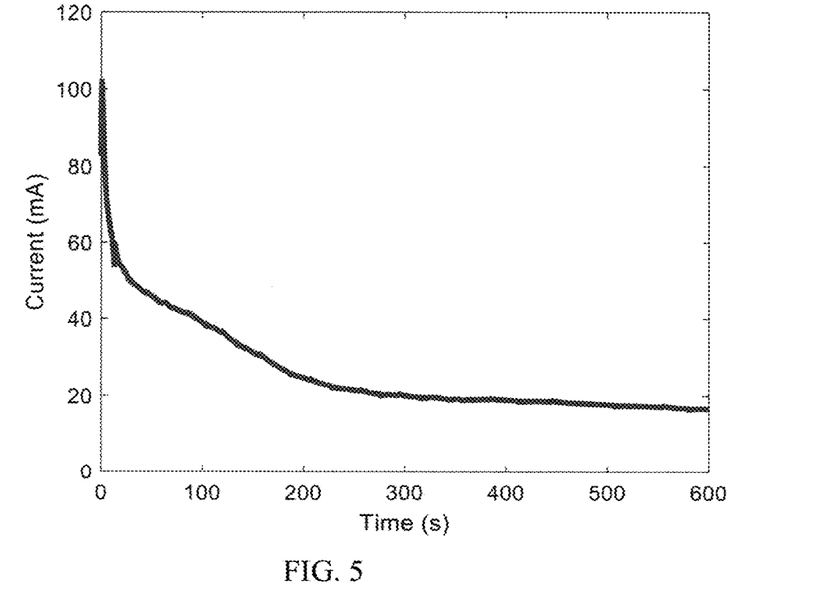
FIG. 5 is a graph showing a rate of silver sulfide deposition according to a coating method of the present disclosure.

From the cyclic voltammetry data, a plating potential of −0.75 V vs SSE was selected. The potential was held at −0.75 V while the current was measured. Representative data for the constant potential deposition of silver sulfide is shown in FIG. 5, showing silver sulfide deposition at constant potential (V=−0.75 vs Ag/AgCl).

After the plating was completed, the thickness of the silver sulfide layer was calculated using the bulk density ($\rho$=7.23 g/cm$^3$), the electrode surface area, A, and the total charged passed during plating Q according to equation 1.

$$\text{Thickness} = \frac{Q*MW}{F*\rho*A} \quad (1)$$

Thicknesses in the range of approximately 1-40 um have been tested without significant difference in the measured potentials.

Figure 6:
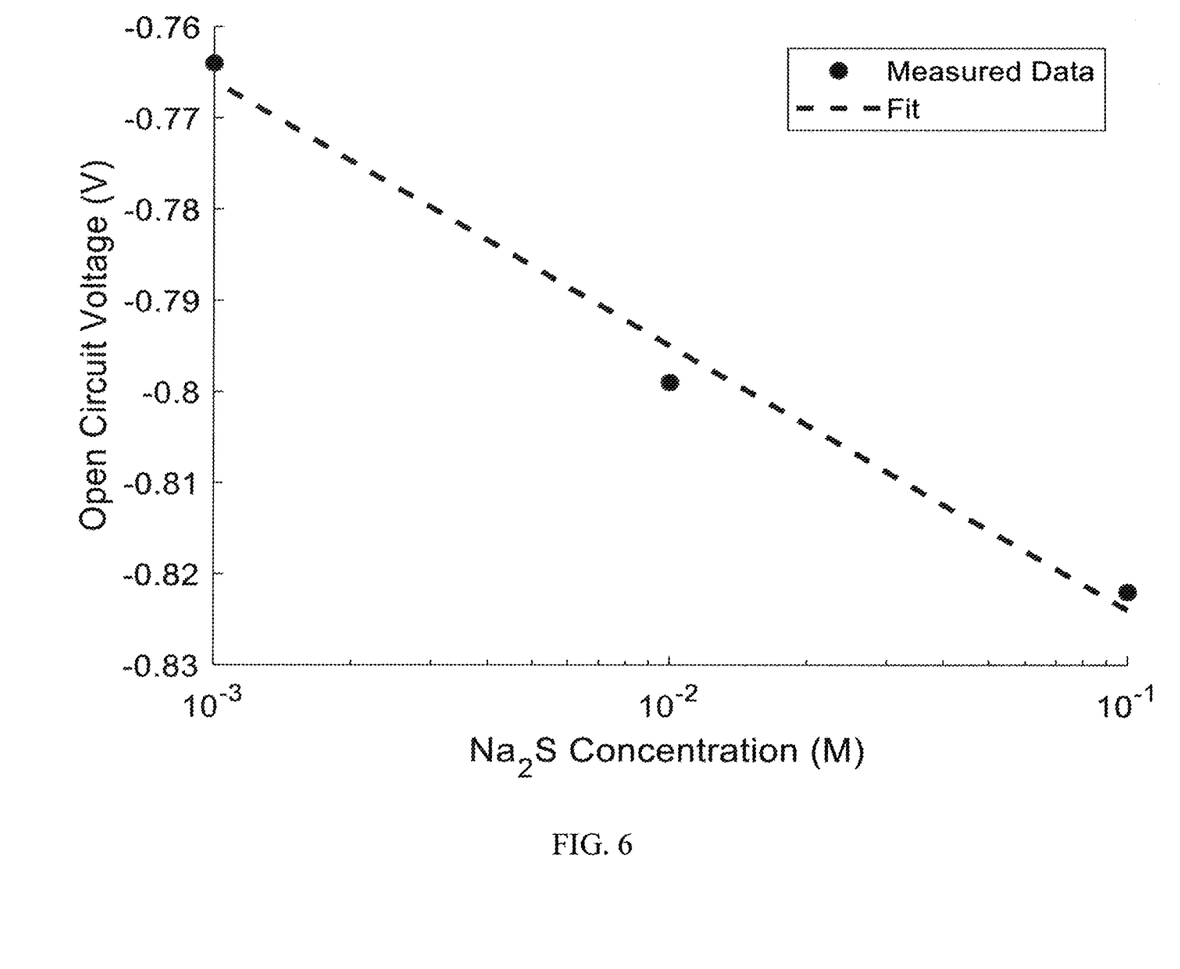
FIG. 6 is a graph showing potential of a reference electrode according to the present disclosure vs. Ag/AgCl (saturated KCl) as a function of sulfide concentration in an aqueous solution.

Potential of the Silver/Silver Sulfide Electrode in Water
a) The potential of the silver/silver sulfide wire depended on the concentration of Na$_2$S, as shown in FIG. 6. FIG. 6 shows measured potential of Ag/Ag$_2$S electrode vs Ag/AgCl (saturated KCl) as a function of sulfide concentration in aqueous solution. The Ag$_2$S electrode was in a solution of 1 M NaOH and different concentrations of Na$_2$S were as shown on the x-axis.
b) The measured potential was fit to equation 2 where A and B are fitting parameters. A is the standard reduction potential and B is equal to ln(10)*RT/zF. B was expected to be 29.6 mV for a 2-electron process.

$$(a)\ E = A - B\ \log_{10}(C) \quad (2)$$

c) The data shown in FIG. 6 gave a good fit to equation 2 with A=−0.853 V and B=0.029 V (29 mV). The slope, B, was in good agreement with the expected slope for a 2-electron process. The standard reduction potential of silver sulfide was −0.89 V vs Ag/AgCl which corresponds to a small offset between the fitted value of −0.853 V.

Figure 7:
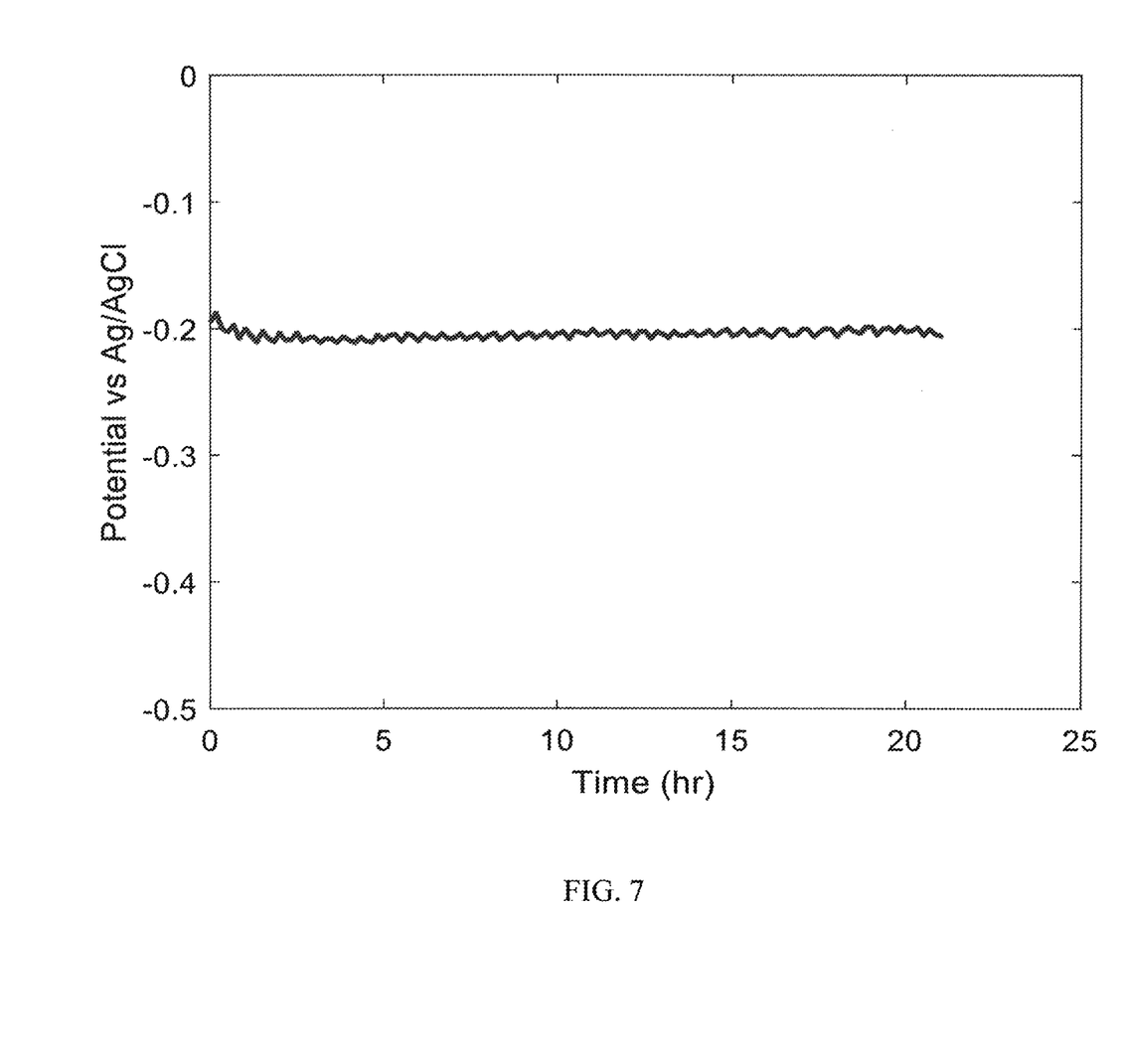
FIG. 7 is a graph showing stability over time for the potential of a reference electrode according to the present disclosure.

Potential of the Ag/Ag$_2$S Electrode in Sulfide Free Solution
a) The potential of the Ag/Ag$_2$S electrode in saturated KCl solution was measured against Ag/AgCl to determine if the Ag/Ag$_2$S electrode can be used in the absence of sulfide. The result was as shown in FIG. 7, which shows potential of Ag/Ag$_2$S vs Ag/AgCl in saturated KCl solution.
b) The potential was constant at −0.2 V during an overnight period. Assuming the potential is set by the silver-ion concentration in solution, then the expected potential is given by equation 3.

$$E = E^0 + 0.058 V * \log_{10}([Ag^+]) \quad (3)$$

c) Assuming the only source of silver ion in solution is from the dissolution of Ag$_2$S with a solubility product of 6.3×10$^{-50}$ then the concentration of silver ion is calculated by equations 4 and 5.

$$K_{sp} = [Ag^+]^2[S^{2-}] = \frac{[Ag^+]^3}{2} \quad (4)$$

since Ag$_2$S→2Ag$^+$+1S$^{-2}$ and if Ag$^+$=x, then S$^{-2}$=x/2, so [2Ag$^+$][S$^{-2}$]=x$^3$/2.

$$\text{Solving } [Ag^+] = (2K_{sp})^{1/3} = 5 \times 10^{-17} \quad (5)$$

The reduction potential of Ag$^+$ is 0.8 V vs NHE. using the result of equation 5 in equation 3 (in which $\log_{10}([Ag^+])=-16.3$) gives a theoretical potential, −0.155 V vs SHE. Since SSE is +0.2 vs NHE this is −0.355 vs SSE (sat'd Ag/AgCl). The measured value was −0.2 V vs SSE. Over a day, the measured potential of the silver sulfide electrode was steady at −0.2 vs SSE which is 155 mV more positive than the theoretically expected value of −0.355 vs SSE.

REFERENCES

A number of patents and publications are cited above in order to more fully describe and disclose the invention and the state of the art to which the invention pertains. Full citations for these references are provided below. Each of these references is incorporated herein by reference in its entirety into the present disclosure, to the same extent as if each individual reference was specifically and individually indicated to be incorporated by reference.

We claim:

1. A tubeless reference electrode apparatus, the tubeless reference electrode apparatus comprising:
   a silver wire; and
   a silver sulfide coating formed on the silver wire to produce a silver sulfide coated silver wire, wherein said silver sulfide coated silver wire is prepared by anodizing said silver wire in an aqueous sodium sulfide solution,
   wherein said silver sulfide coated silver wire is coated with titania or magnesia to obtain said tubeless reference electrode apparatus.

2. The tubeless reference electrode apparatus of claim 1, wherein said tubeless reference electrode apparatus shows a stable potential.

3. The tubeless reference electrode apparatus of claim 1, wherein said silver sulfide coated silver wire is coated with titania.

4. A sensor apparatus comprising said tubeless reference electrode apparatus according to claim 1,
   a working electrode, and
   a counter electrode,
   wherein said sensor apparatus generates sensor output values which are optionally transformed into one or more kinetic parameters of a material.

5. The sensor apparatus of claim 4, wherein the sensor output values are generated on board the sensor apparatus, processed and transformed to the one or more kinetic parameters of said material via a data logger, potentiostat, other sensor reading, or computing device that is hard-wired or wirelessly connected to the sensor apparatus, whereupon sensor data is presented to a user using a local sensor mounted or remote wireless visual display.

6. The sensor apparatus of claim 4, wherein the sensor output values are generated on board the sensor apparatus, stored in local sensor mounted memory, processed and transformed to the one or more kinetic parameters of said material via an onboard sensor mounted computer, and presented to a user using a local sensor mounted visual display.

7. The sensor apparatus of claim 4, wherein an array of said sensor output values are transmitted to a central server, either in a local area network or cloud based, wherein sensor output data is stored in server memory, automatically transformed to desired kinetic parameters of said material via a server computer and presented to a user using a visual display.

8. The sensor apparatus of claim 4, wherein said material is metal in a pipe.

9. The sensor apparatus of claim 4, wherein said sensor apparatus provides either hard-wired or wireless delivery of said sensor output values to a separate local area network or cloud-based computing system whereupon sensor data is presented to a user using a hard-wired or remote wireless visual display.

10. The sensor apparatus of claim 4, wherein the one or more kinetic parameters of said material is chosen from corrosion potential and corrosion rate of a metal in corrosive medium.

* * * * *